United States Patent [19]

Cawthorne

[11] Patent Number: 4,876,489
[45] Date of Patent: Oct. 24, 1989

[54] SIGNAL PROCESSING

[75] Inventor: Christopher D. Cawthorne, Hertford, Great Britain

[73] Assignee: STC PLC, London, United Kingdom

[21] Appl. No.: 290,875

[22] Filed: Dec. 27, 1988

Related U.S. Application Data

[63] Continuation of Ser. No. 127,908, Dec. 2, 1987, abandoned.

[30] Foreign Application Priority Data

Dec. 9, 1987 [GB] United Kingdom ............... 8629426

[51] Int. Cl.$^4$ .............................................. G01S 3/16
[52] U.S. Cl. .................................... 342/383; 342/174; 342/194; 324/83 Q
[58] Field of Search ............... 342/165, 173, 174, 380, 342/383, 194; 324/83 Q; 307/512; 329/124, 125

[56] References Cited

U.S. PATENT DOCUMENTS

| | | | |
|---|---|---|---|
| 3,278,847 | 10/1966 | Widenor | 324/83 Q |
| 3,794,998 | 2/1974 | Pearson, Jr. et al. | 342/174 |
| 3,876,947 | 4/1975 | Giravdon | 342/383 |
| 3,883,870 | 5/1975 | Kunz | 342/174 |
| 3,950,750 | 4/1976 | Churchill et al. | 342/174 |
| 4,079,381 | 3/1978 | Piesinger | 342/383 |
| 4,105,977 | 8/1978 | Fitting et al. | 342/383 |
| 4,214,244 | 7/1980 | McKay et al. | 342/383 |
| 4,394,659 | 7/1983 | Gellekink | 342/174 |
| 4,475,008 | 10/1984 | Beard | 342/174 |
| 4,484,194 | 11/1984 | Arvidsson | 342/174 |
| 4,520,361 | 5/1985 | Frazita | 342/174 |
| 4,584,710 | 4/1986 | Hansen | 342/174 |
| 4,642,642 | 2/1987 | Uurtamo | 342/165 |

FOREIGN PATENT DOCUMENTS

8601057 2/1986 PCT Int'l Appl. .

Primary Examiner—Thomas H. Tarcza
Assistant Examiner—David Cain
Attorney, Agent, or Firm—Lee & Smith

[57] ABSTRACT

A method of and an arrangement for the combined correction of I/Q phase and amplitude imbalances within channels and interchannel phase and amplitude mismatches in arrays of signal channels. The I and Q channels of a reference channel are orthogonalized while simultaneously commencing the correction of an auxiliary channel. Optimum correction is obtained with reduction in hardware in comparison with a cascaded correction method, the auxiliary channel I and Q components being transformed only once.

6 Claims, 9 Drawing Sheets

PHASE CORRECTOR | AMPLITUDE CORRECTOR

| | MULTIPLY | ADD/SUB | LOOK UP FUNCTION (NO. LUT) | TOTAL |
|---|---|---|---|---|
| D.C. OFFSETS | | | | |
| Fig. 2. | 2 | 4 | 0 | 6 |
| Fig. 3 | 4 | 4 | 0 | 8 |
| I/Q CHANNEL | | | | |
| Fig. 4. | 8 | 5 | 0 | 13 |
| Fig. 5. | 9 | 5 | 1 | 15 |
| Fig. 6. | 8 | 5 | 3(2) | 16 |
| INTERCHANNEL | | | | |
| Fig. 7. | 9 | 5 | 1 | 15 |
| Fig. 8. | 10 | 7 | 1 | 18 |
| Fig. 9. | 15 | 12 | 1 | 28 |
| COMBINED | | | | |
| Figs 10,11 | 20 | 12 | 2(1) | 34 |
| Figs 12-15 | 16 | 9 | 2(2) | 27 |

Fig. 17.

| | MULTIPLY | ADD/SUB | LOOK UP FUNCTION (NO. LUT) | TOTAL |
|---|---|---|---|---|
| CASCADED | | | | |
| Fig. 4. / Fig. 7. | 17+1 | 10+1 | 1+1 | 28+3 |
| Fig. 5. / Fig. 7. | 17 | 10 | 2 | 29 |
| Fig. 5. / Fig. 8. | 18 | 11 | 2 | 31 |
| COMBINED | | | | |
| Figs 10,11 | 19 | 11 | 2(1) | 32 |
| Figs. 12-15 | 16 | 9 | 2(2) | 27 |

SIGNAL PROCESSING

This application is a continuation, of application Ser. No. 127,908, filed 12/2/87.

BACKGROUND OF THE INVENTION

This invention relates to signal processing and in particular to digital data error correction in signal processing arrays.

SUMMARY OF THE INVENTION

According to one aspect of the present invention there is provided a method for the correction of I/Q phase and amplitude imbalances within channels and for the correction of interchannel phase and amplitude mismatches in arrays of signal channels, which method combines the correction operations and includes the steps of orthogonalising the I and Q channels of one said signal channel which comprises a reference channel and simultaneously commencing the correction of another said signal channel which comprises an auxiliary channel.

According to another aspect of the present invention there is provided an arrangement for the combined correction of I/Q phase and amplitude imbalances within channels and interchannel phase and amplitude mismatches in arrays of signal channels including means for orthogonalising the I and Q channels of one said signal channel which comprises a reference channel and simultaneously commencing the correction of another said signal channel which comprises an auxiliary channel.

BRIEF DESCRIPTION OF THE DRAWINGS

Embodiments of the invention will now be described with reference to the accompanying drawings, in which:

FIGS. 2 to 15 are module descriptions for correction algorithms which indicate the individual algorithmic steps needed to implement the algorithms, in particular;

SPECIFIC DESCRIPTION OF THE PREFERRED EMBODIMENTS

The performance of digital adaptive interference cancellation algorithms is dramatically affected by hardware errors. Three types of error are D.C. offsets, I/Q phase and amplitude imbalances, and interchannel phase and amplitude mismatches. It is possible to correct for each of these errors digitally.

In the case of a system including ZIF (zero intermediate frequency) receivers and subsequent ADC stages, the D.C. offsets are spurious zero frequency "signals" introduced at the ADC stage after down conversion to zero IF baseband. The D.C. offset components introduced across a multi-channel receiver can result in the unnecessary use of an extra degree of freedom in the adaptive cancellation algorithm. Consequently these offsets should be reduced prior to the adaptive process to such a degree that they lie below the level of the weakest desired signal.

I/Q amplitude and phase imbalance errors are incurred at the quadrature splitter and post-splitter filtering stages of the ZIF receiver, consider for instance an imperfect channel receiving a CW jamming signal. If the I and Q channels are at angle $\delta$ from orthogonal, and there is an amplitude mismatch of $\gamma$ between the channels, then the outputs of the ZIF can be written as:

$$X_i = A \cos \phi \quad (1)$$

$$X_q = A\gamma \sin(\phi + \delta) \quad (2)$$

where $\phi = wt + \alpha$

By insepction it is possible to represent the output as a sum of two complex signals:

$$X_i + j X_q = \frac{A}{2}\{1 + \gamma \exp(j\delta)\}\exp(j\phi) + \frac{A}{2}\{1 - \gamma \exp(-j\delta)\}\exp(-j\phi) \quad (3)$$

Thus the effect of the imbalances is to introduce a "ghost" signal within the negative frequency domain, with a phase gradient across an array which is opposite to that of the main signal. Should the errors be significant, the "ghost" may capture a degree of freedom within the adaptive process or prevent the output residual from being minimised sufficiently. Hence any correction is required to orthoganlise the axes (I and Q) such that the spurious signal lies at least "the maximum achievable null depth down on the main signal". Table 1 below indicates the constraint on both $\delta$ and $\gamma$ for particular null depths.

TABLE 1

| Null depth (dB) | Maximum phase error (°) | Maximum gain err ($\lvert 1 - \gamma \rvert$) |
|---|---|---|
| 30 | 3.620 | 0.0614 |
| 40 | 1.150 | 0.0198 |
| 50 | 0.362 | 0.0063 |
| 60 | 0.115 | 0.0020 |

In the case of an application such as digital radio, images from large off-centre unwanted signals may swamp a smaller wanted signal on the opposite side (in the r.f. spectrum) of the local oscillator. Ideally in this mode of operation the images should be suppressed by at least as much as any other spurious responses.

Figure 1:
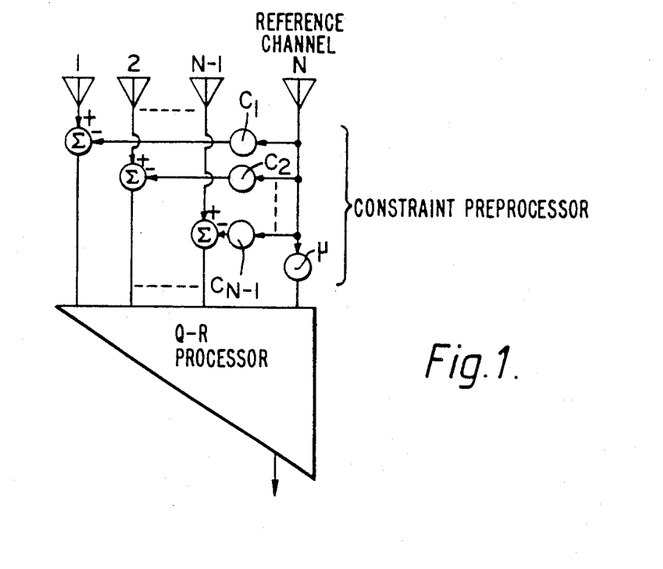
FIG. 1 illustrates the arrangement of a single look constraint preprocessor.

Interchannel mismatches do not affect the ability of the algorithm to perform for narrowband applications. They do, however, affect the ability to apply look direction constraints with any degree of confidence. FIG. 1 shows a single look direction constraint preprocessor. Consider the reference channel with an output $X_r$ and a mismatched channel having an output $X_c$, then:

$$X_r = X_{ir} + j X_{ic} = A \exp j(\phi) \quad (4)$$

$$X_c = X_{ic} + j X_{qc}$$
$$= A\gamma' \exp j(\phi + \alpha + \delta') \quad (5)$$

where $\alpha$ is the expected phasing between the antenna elements in the array, $\delta'$ is the phase mismatched and $\gamma'$ is the amplitude mismatch. In constraining the array response in a particular signal direction, the expected contribution from that direction in any channel is removed by weighting the reference channel signal and substracting it from that channel (affecting contributions from other directions). Thus there is required a constraint preprocessor module which implements the function:

$$X_c' = X_c - X_r \exp j\alpha$$

A residue in each of the auxiliary channels remains when errors are present. This residue is defined as variable parameter $R_i$, where:

$$R_i = A\{\alpha' \exp j\delta' - 1\} \exp j(\phi + \alpha)$$

In order to prevent nulling of a constrained signal it is necessary that this residue be buried below the noise floor. The following Table 2, details the maximum permissible interchannel errors for particular SNR's (assuming no signal integration).

TABLE 2

| SNR (dB) | Maximum phase error (°) | Maximum gain error ($|1 - \gamma|$) |
|---|---|---|
| 30 | 1.812 | 0.0316 |
| 40 | 0.573 | 0.0100 |
| 50 | 0.181 | 0.0032 |
| 60 | 0.057 | 0.0010 |

Figure 2:
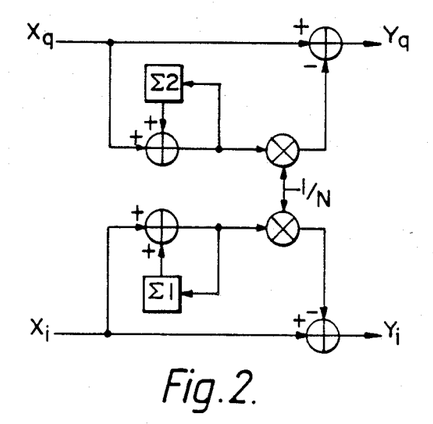
FIGS. 2 and 3 refer to DC offset correction.
Figure 3:
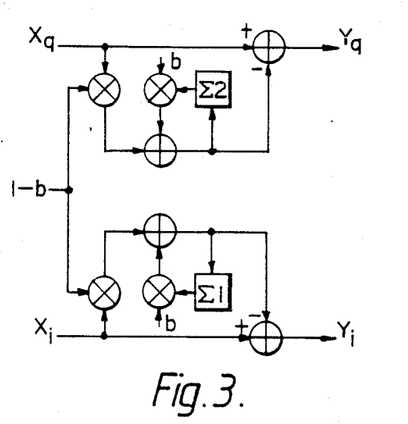

Compensating for D.C. offsets can be done by estimating the D.C. component and subtracting it from the input data samples. This estimate is best arrived at by low pass filtering the input signal, which can consist of offset and noise only, thereby implying that the system be in a special calibration state. FIGS. 2 and 3 illustrate two estimation methods. The first method (FIG. 2) is a non-recursive method and involves a "box car" summation over N input samples:

$$V_{dc} \approx \Sigma V_i(n\tau)/N$$

As the window length increases a better estimate is obtained. The second method (FIG. 3) is a recursive method. A unity gain recursive 6 dB/octave filter is implemented:

$$V_{dc}(n\tau) @ bV_{dc}((n-1)\tau) + (1-b)V_i(n\tau)$$

This method requires the filter coefficient b to be nearly equal to unity to achieve a very low frequency cut-off.

For the following I/Q correction techniques the I channel is assumed to have the correct phase and amplitude and the Q channel is adjusted accordingly. Phase correction is achieved by adding a calculated proportion of the I channel to the Q channel and correction in amplitude by simply scaling the resultant Q channel signal. Thus the corrector algorithm becomes:
$$X_i' = X_i$$

$$X_q' = W_a(X_q + W_p X_i)$$

where $W_a$ and $W_p$ are the amplitude and phase correction weights, respectively.

Consider the input to the corrector from an imperfect channel. Linearity allows us to consider a single CW signal component as described by equations (1) and (2). The corrected signal is given by $$X_i' = A \cos \phi$$

$$X_q' = AW_a\{\gamma(\sin \phi \cos \delta + \cos \phi \sin \delta) + W_p \cos \phi\}$$

since $X_i'$ and $X_q'$ must be orthogonal and equi-amplitude then this allows us to solve for $W_a$ and $W_p$ yielding:

$$W_a = 1/\gamma \cos \delta$$

$$W_p = -\gamma \sin \delta$$

Figure 4:
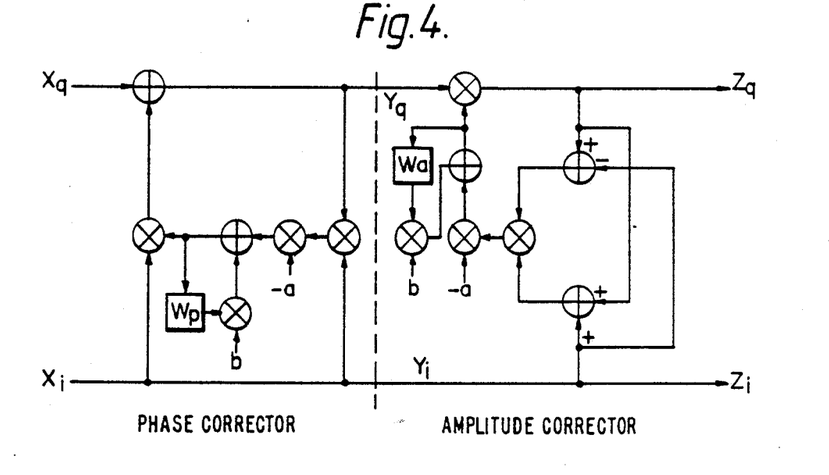
FIGS. 4, 5 and 6 refer to I/Q phase and amplitude imbalance correction.
Figure 5:
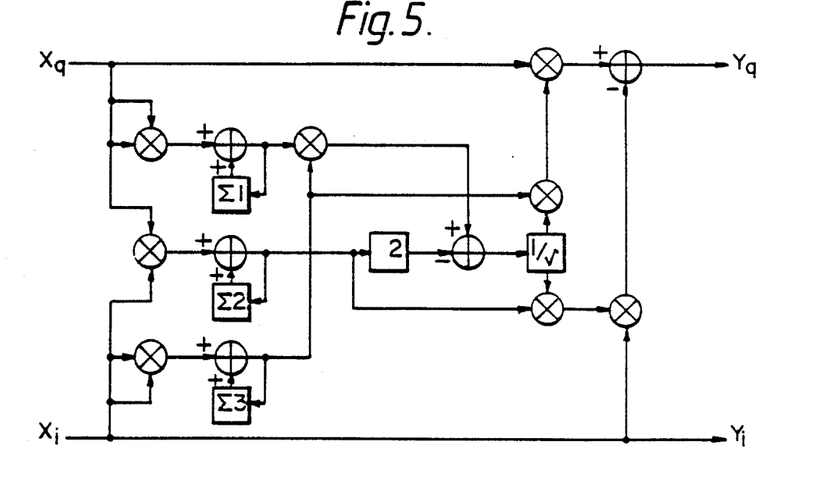
Figure 6:
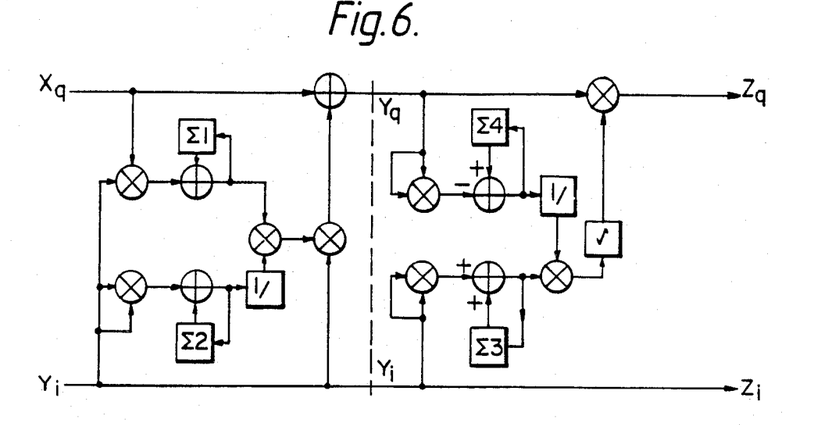

The parameters $W_a$ and $W_p$ may be derived automatically by one of the three methods illustrated in FIGS. 4, 5 and 6. The method of FIG. 4 is a closed loop correction method consisting of a phase corrector followed by an amplitude corrector. I/Q orthogonality is achieved by correlating the outputs from the phase correction section and using a scaled version of the result to update the weight $W_p$, the sign of the loop time constant factor "a" ensures negative feedback. When the outputs are in quadrature then the average correlation will tend to zero and hence the weight will cease to be updated. The update equation for $W_p$ is therefore given by $$W_p(n) = b \cdot W_p(n-1) - a \cdot \{W_p(n-1) \cdot X_q X_i + X_i^2\}$$

Amplitude correction is obtained by calculating an error term from the corrector output $(Z_i^2 - Z_q^2)$ and using this to update the weight $W_a$. When the amplitudes are matched then this error term will tend to a steady state with no further significant update to the weight parameter $W_a$. In both the phase and amplitude sections the coefficient "b" can be set conveniently to unity. The update equation for $W_a$ is given by $$W_a(n) = b \cdot W_a(n-1) - a \cdot (W_a(n-1) \cdot Y_q + Y_i)(W_a(n-1)Y_q - Y_i)$$

The method of FIG. 5 is an open loop method which forms estimates of the parameters $K_1 = W_a$ and $K_2 = W_p \cdot W_a$ using the input data to the corrector, and then calculates an output given by $$X_i' = X_i$$

$$X_q' = K_1 \cdot X_q + K_2 \cdot X_i$$

If the inputs to the corrector are defined by equations (1) and (2) then the product $X_i \cdot X_i$ is given by $$X_i \cdot X_i = \frac{A^2}{2} + \frac{A^2}{2} \cos(2wt + \alpha)$$

If $X_i \cdot X_i$ is averaged over a number of samples and the input signal frequency is sufficiently high then the second term will tend to zero and hence the mean value of $X_i \cdot X_i$ (defined as $<X_i \cdot X_i>$) is given by $$<X_i \cdot X_i> = \frac{A^2}{2}$$

Similarly the terms $<X_q X_q>$ and $<X_i X_q>$ are given by $$X_q X_q = \frac{A^2}{2} \cdot \gamma^2$$

-continued $$X_iX_q = \frac{A^2}{2} \cdot \gamma \sin \delta$$

Satisfactory estimates of $K_1$ and $K_2$ are given by $$K_1 = W_a \approx <X_iX_i> v\{<X_iX_i>\cdot<X_qX_q> - <X_iX_q>^2\}$$

$$K_2 = W_a \cdot W_p \approx <X_iX_q> v\{<X_iX_i>\cdot<X_qX_q> - <X_iX_q>^2\}$$

The method of FIG. 6 is an open loop algorithm involving separate phase and amplitude correction sections. The parameters $W_p$ and $W_a$ are given by the approximations $$W_p = -<X_iX_q>/<X_iX_i>$$

$$W_a = \sqrt{<X_iX_i> v <Y_qY_q>}$$

where $Y_q$ is the imaginary output from the phase corrector section.

Interchannel phase and amplitude correction will now be considered. In the above it was indicated that the correction can be performed when several corrupted signals are present. In the case of interchannel correction a calibration source ($X_{ir}$ reference channel) is required such that the absolute phases of the signal at each antenna element, or corresponding points in the channels, are identical. This allows the relative phase between channels to be perceived at the output.

With interchannel correction, a reference channel is maintained while all the other channels are corrected to align with it. Consider outputs from the reference channel and an imperfect auxiliary channel, both already having been considered for I/Q imbalance, and as described in equations (4) and (5). Interchannel correction is achieved by applying a complex weight to the auxiliary channel signal and is given by $$W_c = W_i - j\cdot W_q = \exp\{-j\delta'\}/\gamma'$$

Thus the outputs to the corrector are $$X_{ic'} = X_{ic}\cdot W_i + X_{qc}\cdot W_q$$

$$X_{qc'} = X_{qc}\cdot W_i - X_{ic}\cdot W_q$$

where $W_q = \sin \delta'/\gamma'$ and $W_i = \cos \delta'/\gamma$.

Three methods of deriving the parameters $W_i$ and $W_q$ will now be described.

Figure 7:
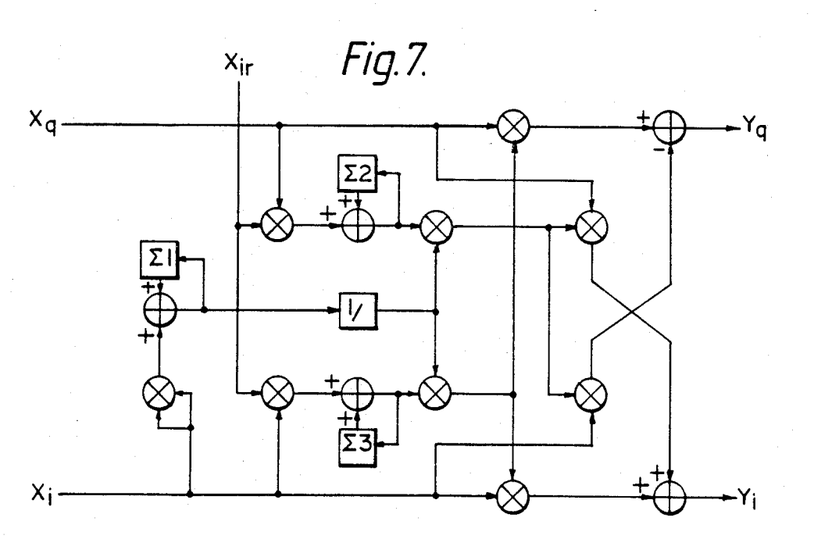
FIGS. 7, 8 and 9 refer to interchannel mismatch correction.

The method shown schematically in FIG. 7 employs the same principles as described for the FIG. 4 method. Using these it can be shown that to a good approximation the parameter $W_i$ and $W_q$ are given by $$W_q = <X_{ir}X_{qc}>/<X_{ic}X_{ic}>$$

$$W_i = <X_{ir}X_{ic}>/<X_{ic}X_{ic}>$$

Figure 8:
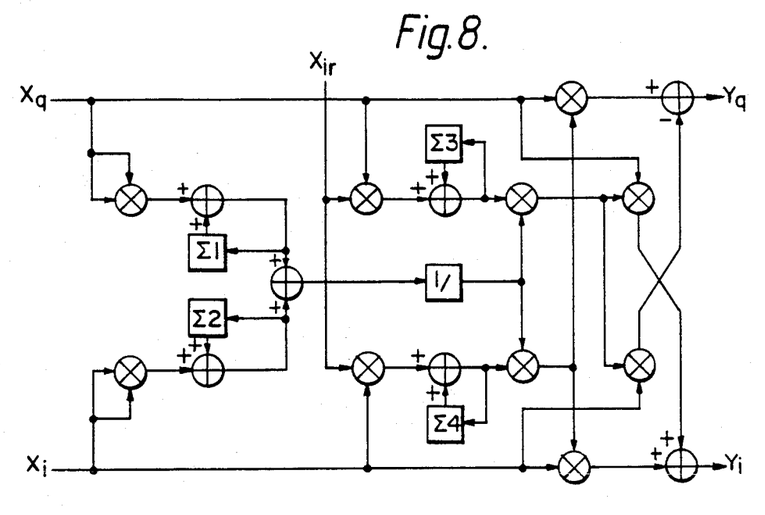

The method shown schematically in FIG. 8 is a modification of that of FIG. 7 and is applicable only to a case when the calibration signal is of a single frequency. In this situation the product $X_c\cdot X_c$ has no oscillating terms and is given by:

$$X_c\cdot X_c = A^2\gamma^2$$

Thus $$W_q \approx 2\cdot <X_{ir}X_{qc}>/<X_{ic}\cdot X_{ic}+X_{qc}X_{qc}>$$

$$W_i \approx 2\cdot <X_{ir}X_{qc}>/<X_{ic}\cdot X_{ic}+X_{qc}X_{qc}>$$

Figure 9:
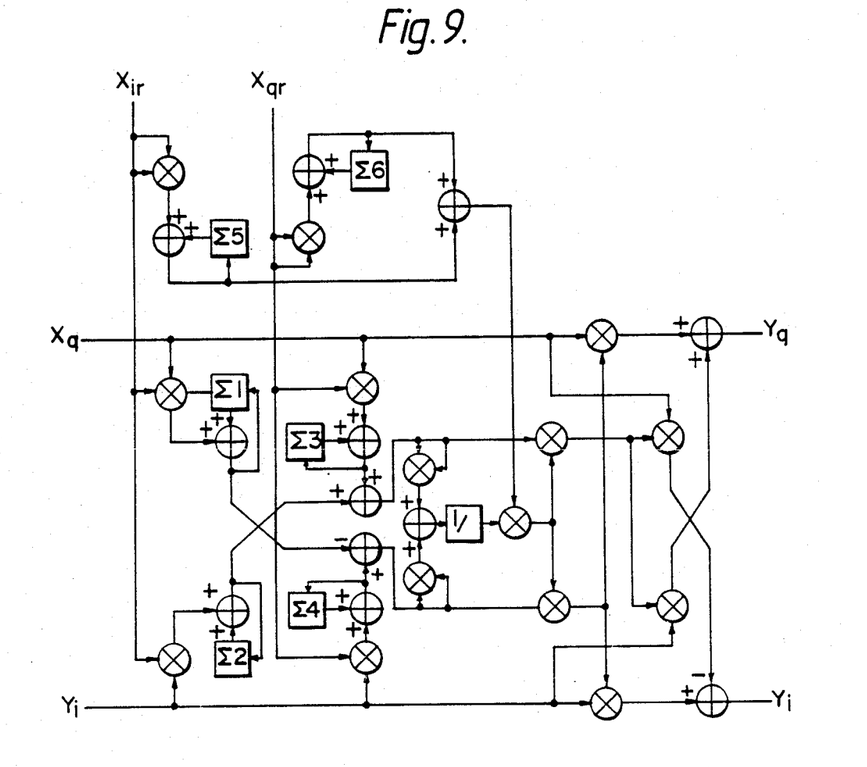

The method shown in FIG. 9 is an extension of the above technique to calculate components of the parameters $W_i$ and $W_q$ that have no oscillating terms. Again this method is only applicable if the calibration source is of a single frequency.

$$W_q = \frac{-<X_{ir}X_{ir} + X_{qr}X_{qr}> \cdot <X_{qr}X_{ic} - X_{ir}X_{qc}>}{[<X_{qr}X_{ic} - X_{ir}X_{qc}>^2 + <X_{ir}X_{ic} + X_{qr}X_{qc}>^2]}$$

$$W_i = \frac{<X_{ir}X_{ir} + X_{qr}X_{qr}> \cdot <X_{ir}X_{ic} + X_{qr}X_{qc}>}{[<X_{qr}X_{ic} - X_{ir}X_{qc}>^2 + <X_{ir}X_{ic} + X_{qr}X_{qc}>^2]}$$

Averages are formed to remove the effects of noise from the parameters.

So far channel (I/Q) correction and interchannel correction have been referred to as separate processes. I/Q correction involves rotating and scaling the Q channel data, and similarly interchannel correction rotates and scales both the I and Q components of the auxiliary channels signals. We now propose a combined I/Q and interchannel correction scheme, and thus a more efficient process, whereby the auxiliary channel I and Q components are transformed only once.

Consider the usual outputs from the reference channel and an auxiliary channel when both are fed with a CW calibration signal. Thus we define $$X_{ir} = A \cos \phi$$

$$X_{qr} = A \gamma \cos (\phi + \delta)$$

$$X_{ic} = A \gamma' \cos (\phi + \delta')$$

$$X_{qc} = A \gamma'' \sin (\phi + \delta'')$$

The reference I and Q channels can be orthogonalised using methods already described above with reference to I/Q phase and amplitude imbalances. During this stage correction of the auxiliary channel signal can be started by orthogonalising $X_{qc}$ with $X_{ir}$. Hence:

$$X_{qc'} = b_q \cdot X_{qc} + a_q X_{ic}$$
$$= A \sin \phi$$

solving for a $a_q$ and $b_{q''}$ yields $$a_q = -\sin \delta/\gamma' \cdot \cos (\delta'' - \delta')$$

$$b_q = \cos \delta'/\delta'' \cos (\delta'' - \delta')$$

The I channel can now be made orthogonal to either the reference Q channel ($X_{qr'}$) or the corrected Q channel ($X_{qc'}$). Thus:

$$X_{ic'} = b_i X_{ic} + a_i X_{qc'}$$
$$= A \cos \phi$$

This leads to $$a_i = \tan \delta$$

$$b_i = 1/\delta' \cos \delta'$$

The weights $a_q$ and $b_q$ can be estimated by calculating the functions $$a_q \simeq - <X_{ir}X_{qc}> v\{<X_{qc}X_{qc}><X_{ic}X_{ic}> - <X_{ic}X_{qc}>^2\}$$

$$b_q \simeq <X_{ir}X_{ic}> v\{<X_{qc}X_{qc}><X_{ic}X_{ic}> - <X_{ic}X_{qc}>^2\}$$

Figure 10:
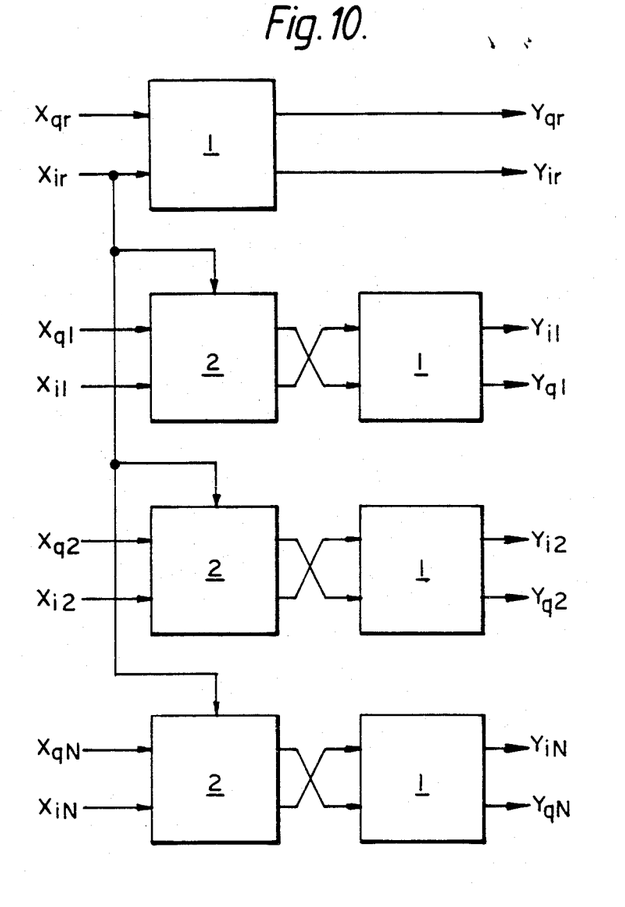
FIGS. 10 and 11 refer to one arrangement for combined channel and interchannel correction.
Figure 11:
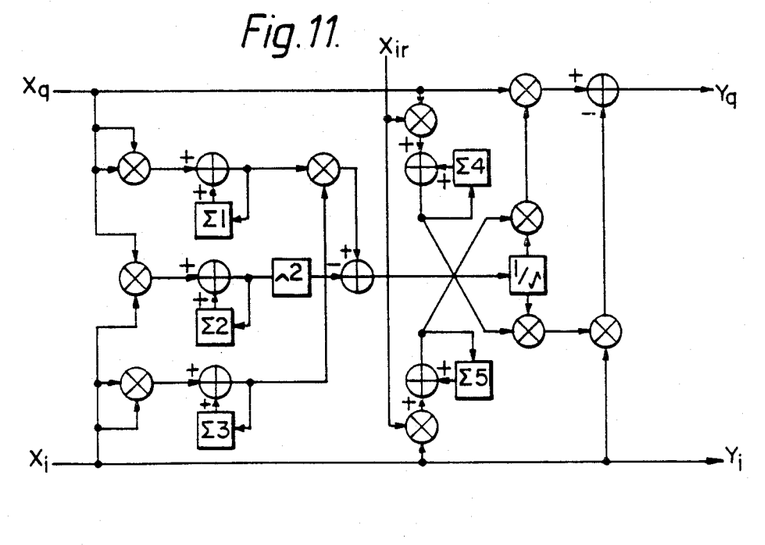

Two techniques for achieving this will now be referred to, they are described schematically in FIGS. 10 and 11 and FIGS. 12 to 15 respectively. In the first technique the channel signal $X_{ic}$ is orthogonalised with reference to the channel signal $X_{qc}$. The weights $a_i$ and $b_i$ are given by $$a_i \simeq - <X_{ic}X_{qc}'> v\{<X_{qc}'X_{qc}'><X_{ic}XC_{ic}> <X_{ic}X_{qc}'>^2\}$$

$$b_i \simeq <X_{qc}'X_{qc}'> v\{<X_{qc}'X_{qc}'><X_{ic}X_{ic}> <X_{ic}X_{qc}'>^2\}$$

With regard to FIG. 10, there is illustrated a reference channel, suffix r, and channels 1, 2 to N. The modules 1 and 2 comprises the functions of FIGS. 1, 5 or 6 and 11 respectively.

In the second technique $X_{ic}$ is orthogonalised with the corrected reference signal $X_{qr}$ and weights $a_i$ and $b_i$ can be formulated by the functions $$a_i = - <X_{qc}'X_{ic}> / <X_{ic}X_{ir}>$$

$$b_i = <X_{ir}X_{ir}> / <X_{ic}X_{ir}>$$

Figure 12:
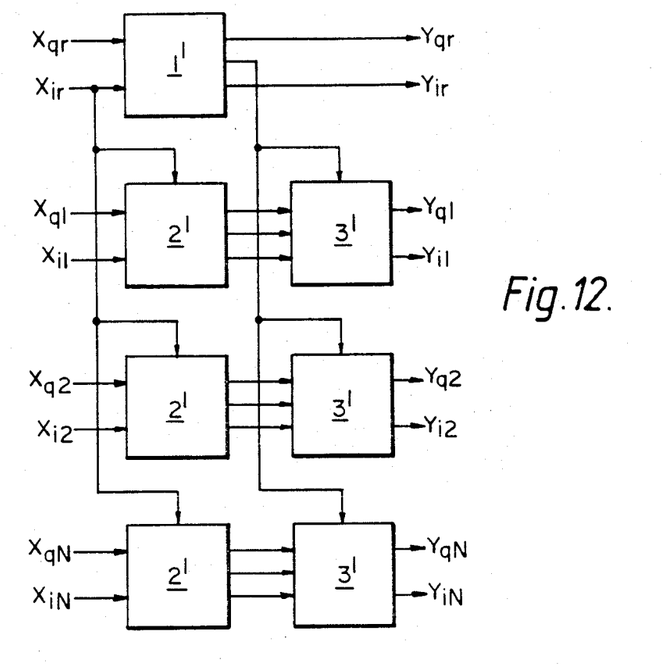
FIGS. 12 to 15 refer to another arrangement for combined channel and interchannel correction.
Figure 13:
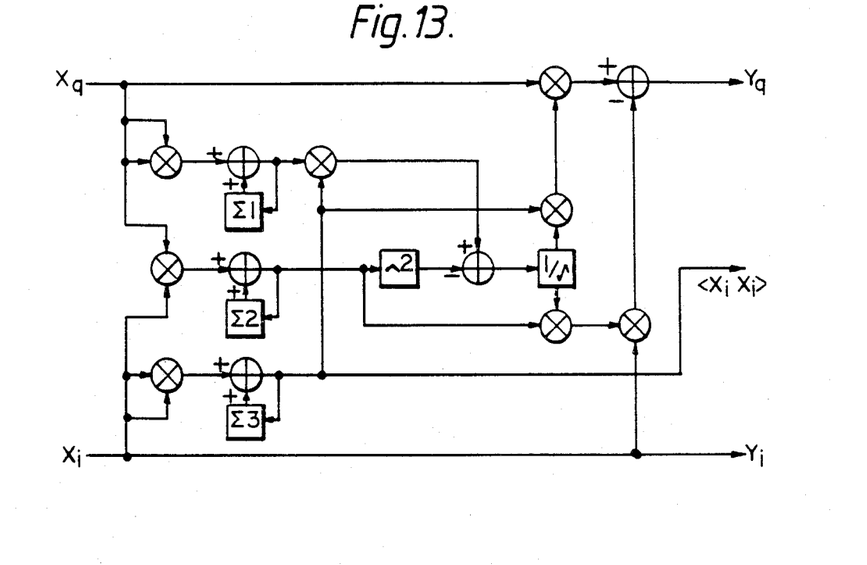
Figure 14:
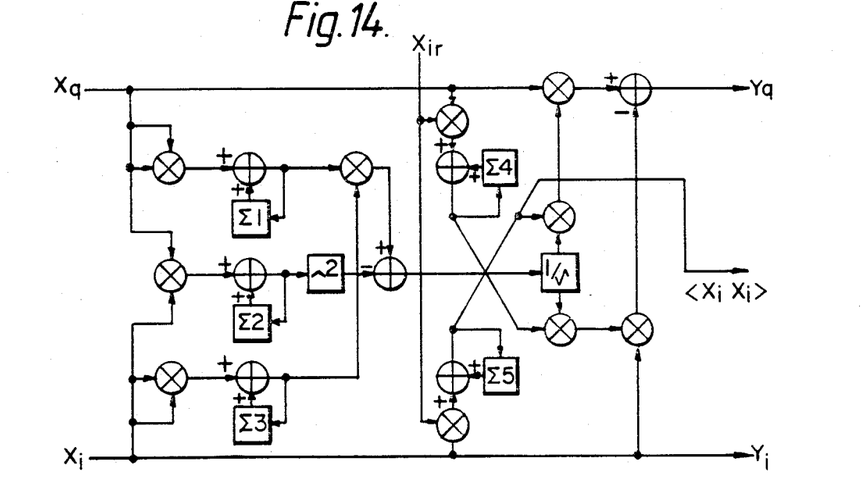
Figure 15:
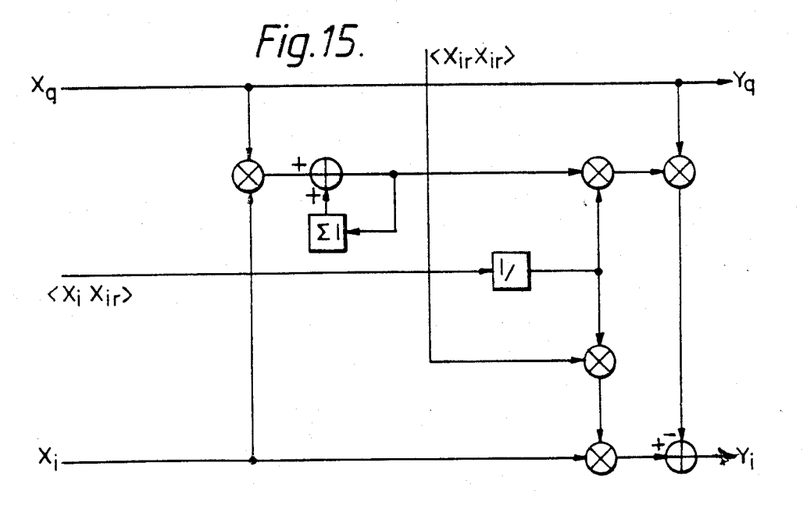

FIG. 12 illustrates a reference channel, suffix r, and channels 1, 2 to N as before. The modules 1', 2' and 3' comprise the functions of FIGS. 13, 14 and 15.

Figure 16:
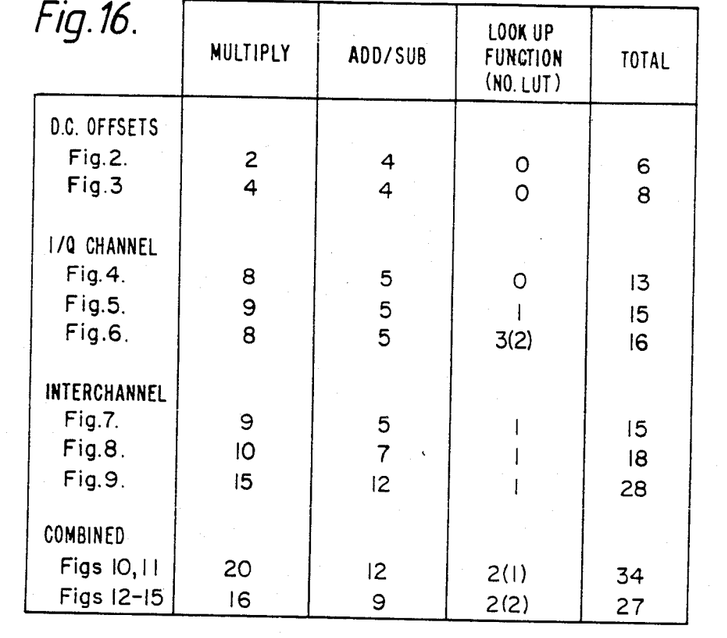
FIGS. 16 and 17 are tables of algorithmic complexities.
Figure 17:
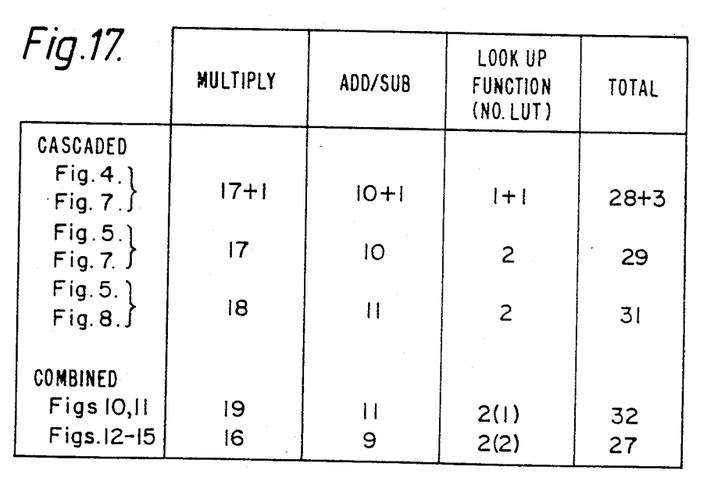

FIG. 16 summarises the algorithm complexities in terms of the number of specific functions and the total number of functions, and FIG. 17 comprises similar tallies in applying both channel and interchannel correction, considering both the combined correction method and a method comprising channel correction cascaded with interchannel correction. Duplicate calculation of products and cross-products has allowed some optimisation of the algorithms to be made.

It can be seen that the I/Q correction method of FIG. 4 is computationally more efficient than the methods of FIGS. 5 and 6, however the loop coefficient "a" is dependent on the signal strength. This means that a calibration signal is required or the coefficient has to be "power level adjusted" with consequential need for more hardware or software. The software would involve one addition, multiply and look up, making this method least efficient in terms of operations. The methods of FIGS. 5 and 6 are fairly well matched in overall complexity, except that the latter requires two look up tables.

The combined correction method of FIGS. 12-15 has a smaller computational overhead than method of FIGS. 10 and 11, but does require two different look up tables rather than one. From FIG. 17 it can be seen that the method of FIGS. 10 and 11 can be optimised, reducing the total number of arithmetic operations by two. The I/Q method of FIG. 4 cascaded by the interchannel method of FIG. 7 yields a total number of arithmetic functions similar to the combined method of FIGS. 12 to 15 and has the advantage of a single look up table, however the hidden overhead in normalising "a" (as shown by the addition sums in FIG. 17) increases the total number of operations by three.

I claim:

1. A method for digitally correcting I/Q phase and amplitude imbalances within signal channels and for correcting interchannel phase and amplitude mismatches in arrays of signal channels, in which method the correcting operations are combined, the method comprising forming I and Q channels from one said channel, orthogonalising the I and Q channels of the one said signal channel, which one said signal channel comprises a reference channel, and employing the orthogonalised I and Q channels of the reference channel to correct phase and amplitude imbalances in the reference channel, and simultaneously commencing correcting another said signal channel, which comprises an auxiliary channel, by forming I and Q channels from said auxiliary channel, and orthogonalising the said Q channel of the auxiliary channel with the I channel of the reference channel.

2. A method as claimed in claim 1, further including the step of orthogonalising the I channel of the auxiliary channel with the Q channel of the auxiliary channel.

3. A method as claimed in claim 1, further including the step of orthogonalising the I channel of the auxiliary channel with the corrected Q channel of the reference channel.

4. An arrangement for combined digital correction of I/Q phase and amplitude imbalances within signal channels and interchannel phase and amplitude mismatches in arrays of signal channels, including means for forming I and Q channels from one said signal channel, means for orthogonalising the I and Q channels of the one said signal channel, which one said signal channel comprises a reference channel, and means employing the orthogonalised I and Q channels of the reference channel to correct phase and amplitude imbalances in the reference channel; and means for simultaneously commencing correction of another signal channel including means for forming I and Q channels from said other signal channel, which other signal channel comprises an auxiliary channel, and means for orthogonalising the said Q channel of the auxiliary channel with the I channel of the reference channel.

5. An arrangement as claimed in claim 4, wherein said means for correction of the auxiliary channel serve to orthogonalise the I channel of the auxiliary channel with the Q channel of the auxiliary channel.

6. An arrangement as claimed in claim 4, wherein said means for correction of the auxiliary channel serve subsequently to orthogonalise the I channel of the auxiliary channel with the corrected Q channel of the reference channel.

* * * * *